United States Patent [19]

Poitevin

[11] Patent Number: 4,807,319
[45] Date of Patent: Feb. 28, 1989

[54] SELF CONTAINED HIGH PRESSURE HOT WATER CLEANING SYSTEM FOR GROCERY CARTS

[76] Inventor: Anton Poitevin, 911 Durango, Great Falls, Mont. 59404

[21] Appl. No.: 89,353

[22] Filed: Aug. 24, 1987

[51] Int. Cl.[4] ............................................. A47L 11/00
[52] U.S. Cl. ..................... 15/21 D; 134/72; 134/131; 134/133; 134/172
[58] Field of Search ....................... 134/61, 70, 72, 95, 134/99, 107, 123, 131, 133, 144, 155, 172, 200; 15/21 C, 21 D, 53 AB

[56] References Cited

U.S. PATENT DOCUMENTS

| | | | |
|---|---|---|---|
| 2,997,048 | 8/1961 | Gertken et al. | 134/123 X |
| 3,022,791 | 2/1962 | Larson | 134/123 X |
| 3,096,775 | 7/1963 | Clarke et al. | 134/123 |
| 3,179,117 | 4/1965 | Gibson et al. | 134/123 X |
| 3,258,019 | 6/1966 | Bellas et al. | 134/123 X |
| 3,289,238 | 12/1966 | Sorenson et al. | 134/123 X |
| 3,444,867 | 5/1969 | Thornton | 134/123 |
| 4,279,263 | 7/1981 | Pulliam | 134/123 X |
| 4,562,848 | 1/1986 | Messing et al. | 134/123 |

FOREIGN PATENT DOCUMENTS 2928481 1/1981 Fed. Rep. of Germany ...... 134/123

Primary Examiner—Timothy F. Simone
Assistant Examiner—Frankie L. Stinson
Attorney, Agent, or Firm—Wells, St. John & Roberts

[57] ABSTRACT

A self contained high pressure hot water cleaning system for grocery carts is disclosed in which a trailer mounted fully enclosed system allows the automatic passage of individual grocery carts from one end to the other by the use of a conveyor passing through a wash tunnel having spray nozzles. The wash tunnel also provides a pair of rotating brushes, a spent fluid holding tank, a cleaning fluid supply tank, a sanitizing fluid supply tank, associated pumps as well as a heater for heating the cleaning fluid. The self contained system further provides a hand operated wand at the entrance of the wash tunnel to allow an operator to remove difficult accumulation of grime from the grocery carts. A lifting table and exit ramp is also provided.

9 Claims, 2 Drawing Sheets

SELF CONTAINED HIGH PRESSURE HOT WATER CLEANING SYSTEM FOR GROCERY CARTS

BACKGROUND OF THE INVENTION

1. Field of the invention

The invention relates to a self contained high pressure hot water cleaning system for grocery carts and in particular to such a system which is mobile and provides for the use of a sanitizing fluid application after cleaning.

2. Discussion of the Technical Problems

Supermarkets, grocery stores and the like provide grocery carts for customer's convenience. The carts are adapted to hold the customer's selected purchases. The carts thus contain food, including liquids, which in time are spilled or come in contact with the cart surfaces. Also many customers have small children who are carried in the carts. Not only is it unsanitary to continue to use dirty, unwashed carts but in time such use could promote the spreading of disease as microorganisms will multiply where food items have been left.

Since it is good sanitation practice to have the carts cleaned at regular periodic intervals, a definate need exists for a system which will clean ordinary grocery carts in a short period of time.

The standard wire rod or mesh basket grocery cart is provided with a handle, a basket mounted in a frame, and generally four caster mounted wheels. The carts vary greatly in design, however, they all present a basket to allow the purchaser to move their selected items and in most cases they provide a seat and pivoting support for the seat for the carrying of infants and small children.

As previously mentioned, due to the nature of the produce hauled in the carts and the gradual accumulation of filth upon the carts it is highly desirable that the carts be periodically cleaned. Failure to thoroughly clean such carts could reduce the level of customers to a particular store since customers prefer not to use unsanitary, soiled carts. On the other hand, if the grocery carts were periodically cleaned and sanitized the food outlet store could advertise such a fact which would greatly enhance the trade at that outlet.

The standard practice at most stores which utilize shopping carts is to clean the carts manually by the use of high pressure steam or hot water wands and then to have the detergent and hot water rinsed away by the use of a fresh water spray.

Unfortunately, manual washing of carts is inefficient so that it costs far too much per cart to clean the carts. It also leaves a mess in the parking lot. It is not uncommon for large supermarkets to have 200 or more carts in their establishment, so inefficient manual washing of so many carts is too costly. The grocery store owner may be forced to increase the interval between washing cycles and thus deprive his customers of the clean, sanitary carts which they desire.

In order to provide for an automatic cart washing system some inventions have been made which somewhat automate the process thereby eliminating the need for a total manual washing. Automation reduces the cost of washing the cart, however, the prior art cleaning devices for grocery carts suffer from a number of definate drawbacks.

Prior art cleaning devices for grocery carts are generally of the type which provide an enclosure, spray nozzles, and a means for introducing the carts in a nesting fashion and retrieving them upon having the cart sprayed with a detergent solution. Such devices do not provide for a readily mobile washing of carts nor a complete system in which the carts are sanitized and ready for customers use. Also, such devices generally fail to provide for the recirculation of fluids employed so the fluids are wasted whereas they could be recycled to more efficiently wash the carts. Most of the grocery cart washing devices provide for a semi-automatic washing of the cart, however, none are known which provide for a mobile washing system utilizing high pressure hot water and using recirculating high pressure hot water, and sanitizing for the carts. Examples of known grocery cart cleaning devices can be found in U.S. Pat. No. 2,997,048 to Gertken, et al. issued Aug. 22, 1961, U.S. Pat. No. 3,179,117 to Gibson, et al. issued Apr. 20, 1965, and U.S. Pat. No. 3,698,029 to Pulliam issued Oct. 17, 1972.

Very few devices in the known art relate to the automatic washing of individual grocery carts and none known are directed to provide such an automated washing system in which sanitizing is also provided for in the washing of the carts.

In a different type of apparatus as disclosed in U.S. Pat. No. 3,736,948 to Crosswhite issued June 5, 1973, an apparatus for washing hospital carts is disclosed in which a sanitizing fluid from a remote source is used to spray upon hospital carts.

U.S. Pat. No. 4,279,263 to Pulliam issued July 22, 1981, discloses a portable expandable structure for manually washing carts which includes a type of recirculating pump system.

Although the prior art dicloses a number of interesting cart washing inventions, a complete cleaning and sanitizing system employing recirculating high pressure water and recirculating sanitizing fluid in a mobile self contained system adapted for a truck or trailer is not shown. Such an invention would greatly reduce the costs of washing grocery carts, thus allowing the store owners to have the carts washed and sanitized at a more frequent interval.

Accordingly, a need exists for a self contained high pressure hot water cleaning system for grocery carts employing sanitizing fluid and being adapted for carriage on a truck or trailer so that it can be taken to a number of establishments for the cleaning of the grocery carts. Such a system would provide a simple, inexpensive apparatus that could wash a cart in a matter of seconds, return the cart to service with complete confidence of customers in its cleanliness. A cleaning system of that type would provide a system that is simple in design, easy to maintain, and easy to adjust to different types of grocery carts. Such a device should be easily repaired, not subject to damage by proper use and simple to manufacture. The instant invention is directed to all of these needs as well as to others as explained in the following summary.

SUMMARY OF THE INVENTION

The primary purpose of the invention is to provide a self contained high pressure cleaning system for grocery carts which is mobile, easily adapted to a number of designs of grocery carts, and provides for a self contained recirculation of fluids used so that when the operator has finished washing the carts no evidence of detergent, sanitizing fluid, grit, grime, or other debris is left as residue. The device is self-contained in that a grocery cart can be moved through the washing and sanitizing tunnel of the device and exited in a complete sanitized state without the necessity for employing additional stations or process steps.

The purposes and features of the invention are obtained by providing a wheeled support frame having a floor containing a holding tank which is in fluid communication with drains. The frame is further provided with a washing tunnel situated on top of a holding tank. The tunnel provides a water containment enclosure for the spraying of high pressure hot water to dislodge grime and dirt from the grocery carts. The grocery carts move through the tunnel by the use of a conveyor. The water which is sprayed by nozzles in the tunnel onto the carts is recirculated by first draining through into the holding tanks where then it can be pumped for further use or it can be held if it becomes sufficiently dirty to be of no further use. The same tunnel apparatus is provided for a sanitizing fluid so that prior to exiting the cleaning system, the grocery cart would be sprayed with a sanitizing fluid to eliminate bacterial growth and insure customer's confidence in the cleanliness of the carts.

The wheeled frame is also provided with a tank to hold a cleaning fluid such as a detergent and associated pump and heater to heat the cleaning fluid solution and heat it for better dislodging of dirt and grime. Nozzles are provided mounted at certain angles within the tunnel to spray the cleaning fluid as well as the sanitizing fluid onto the carts as they individually pass by. The carts are conveyed through the grocery cart cleaning system by the use of a belt conveyor which will easily accomodate any design of cart or any article for cleaning and sanitizing. Powered rotary brushes are provided in the walls of the cleaning tunnel to further scrape and remove excess dirt and grime buildup in the washing process. An area is provided upon the flat surface of the floor of the wheel platform to allow an operator to manually direct a high pressure wand upon particularly excessive buildups of dirt and grime upon the grocery cart. That area is known as the prewash area.

An inclined lift is provided for directing the carts into the washing tunnel so that the operator need not lift each cart for cleaning. An exit ramp is provided for moving the clean, sanitized carts back down to the ground or floor surface.

BRIEF DESCRIPTION OF THE DRAWINGS

The advantages of this invention will become apparent upon consideration of the following detailed disclosure of the invention, especially when taken in conjunction with the accompanying drawings, wherein.

DESCRIPTION OF THE PREFERRED EMBODIMENT

Figure 1:
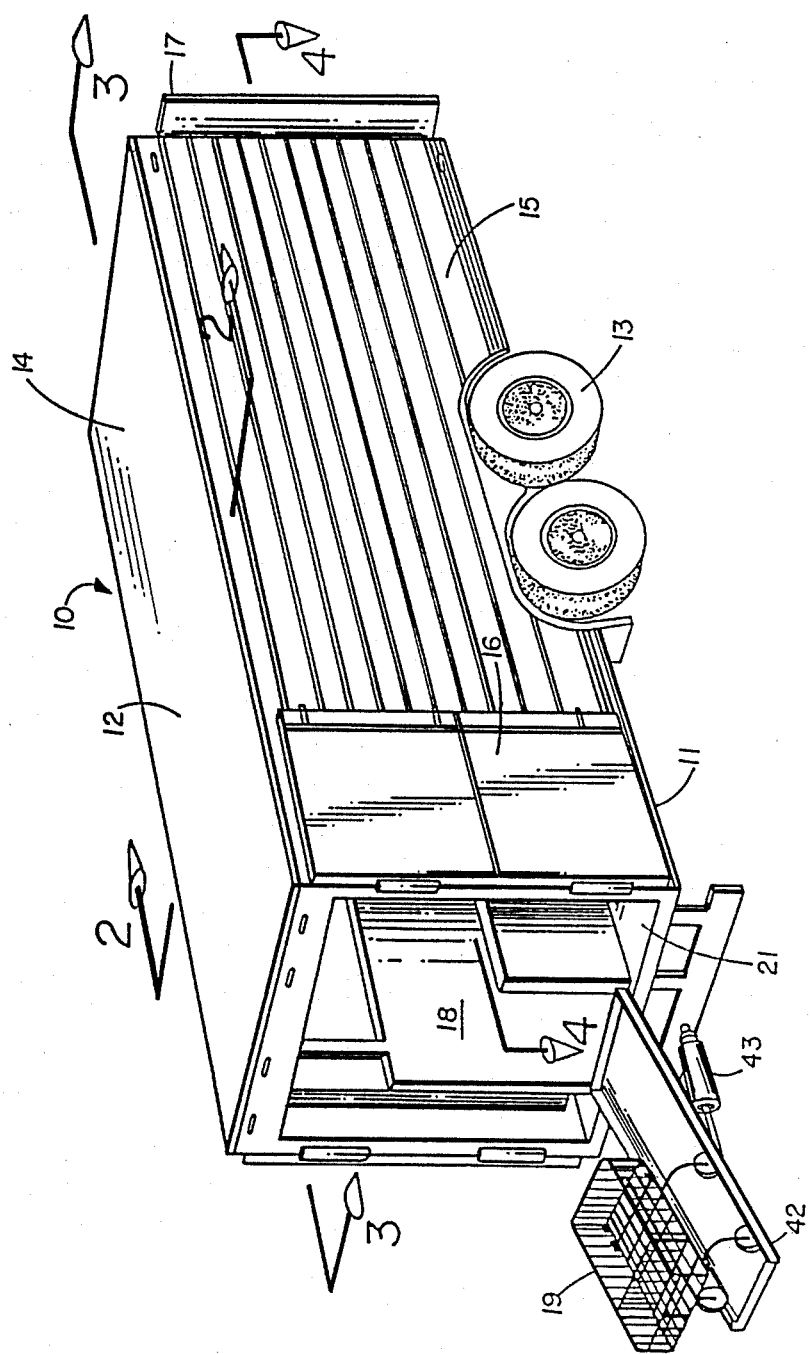
FIG. 1 is a perspective view of the apparatus of the present invention.

The self contained high pressure hot water cleaning system for grocery carts of the instant invention is depicted generally in FIG. 1. As can be seen by reference to FIG. 1, the invention 10 provides a frame 11 having an outer enclosure 12 which is essentially a trailer body. The frame 11 and outer enclosure 12 is further provided with wheels 13 of manner common to trailers. Outer enclosure 12 includes not only the upper surface 14 but also side surfaces 15, rear doors 16, and front doors 17.

Continuing with reference to FIG. 1 it can be seen that the rear doors 16 are in an open position and that a preliminary channel 18 is shown in which is sufficiently wide for grocery carts to move. The interior channel 18 does not have a closed upper surface and serves as a prewash area in that the grocery cart 19 can be placed within the prewash area and an operator standing in the open space 21 can direct a wand (not shown) to grocery cart 19 in a manner so as to remove any excessive accumulation of grime prior to the introduction of the cart 19 through the self contained system.

Figure 2:
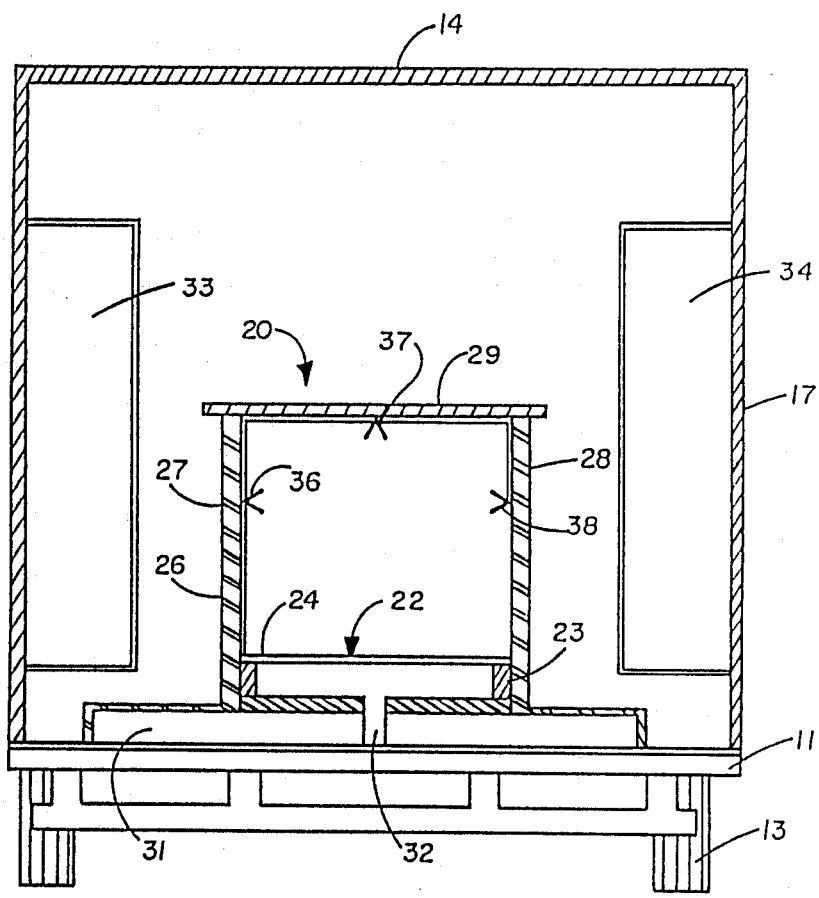
FIG. 2 is a cross section of the apparatus showing the wash tunnel and conveyor portions taken along lines 2—2 of FIG. 1.

With reference to FIG. 2 where the wash tunnel 20 is shown in which the grocery cart 19 can be conveyed by the use of a floor mounted conveyor 22 and associated driving gears 23. Floor mounted conveyor 22 is further provided with endless belt 24 in a manner well known in the art. Wash tunnel 20 is comprised of a molded channel 26 having upstanding walls 27 and 28. Optional upper covering 29 is provided to eliminate the amount of water which escapes from wash tunnel 20. Frame 11 provides a trailer frame upon which is mounted holding tank 31 which is in fluid communication with drain 32 within wash tunnel 20 which allow water to be collected in holding tank 31.

As can be seen from reference to FIG. 2 supply tanks 33 and 34 are provided to contain cleaning solution and sanitizing solutions respectively. Those tanks are in fluid communication with nozzles 36, 37, and 38. The cleaning solution as contained in tank 33 or the sanitizing solution as contained in tank 34 upon the grocery carts 19 moving through tunnel 20. The fluid then drains through drain 32 and to hold in tank 31 which can then be emptied at a later date. The fluid in holding tank 31 could also be recirculated by pumping the fluid in holding tank 31 to spray through nozzles 36, 37, and 38. In that manner the spent fluid could be recycled to provide even greater efficiency of use.

Figure 3:
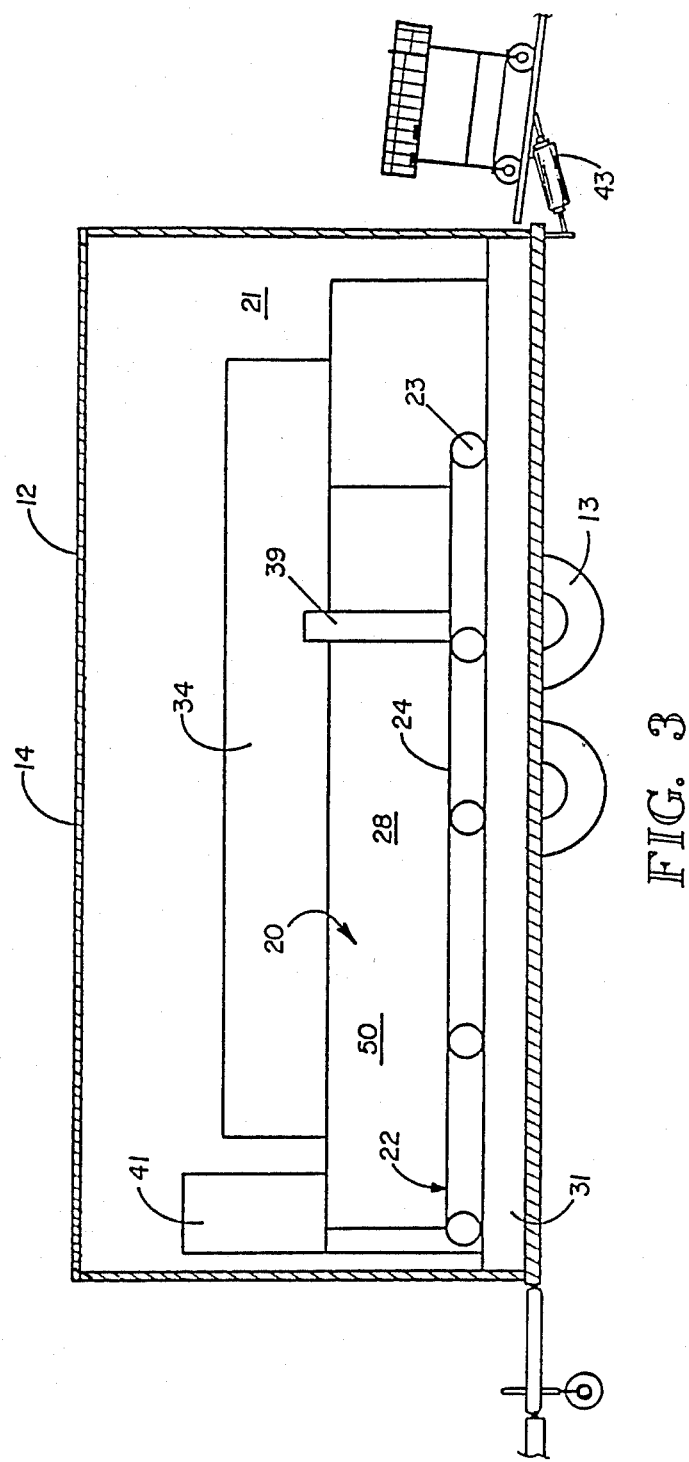
FIG. 3 is a cut away side elevational view of the apparatus taking along lines 3—3 of FIG. 1.

With respect to FIG. 3 it can be seen that wash tunnel 20 is provided with the belt conveyor 22 which is an endless belt 24 and operating on rollers 23 in a manner well known in the art. It can also be seen from reference to FIG. 3 that vertical scrub brush 39 is included within wall 28 of wash tunnel 20 to provide a cleaning scrub of the carts as they pass through the wash tunnel. With continuing reference to FIG. 3 it can be seen that sanitizing pump 41 and sanitizing tank 34 are also included within enclosure 12. Prewash area 21 is provided with a high pressure water wand (not shown) in which an operator can spray a cart as it is in the prewash area 21.

As shown in FIGS. 1 and 2 cart 19 sets upon pivoting platform 42 which is raised and lowered by means of hydraulic power cylinder 43 to lift the carts individually from the ground or floor up to a position which is horizontal with the entrance of wash tunnel 20. A drying area 50 is provided at the exit end of the apparatus 10 in which heated air or other means of drying is provided so that the carts emerge from the apparatus in not only a sanitized but also a dryed condition as well.

Figure 4:
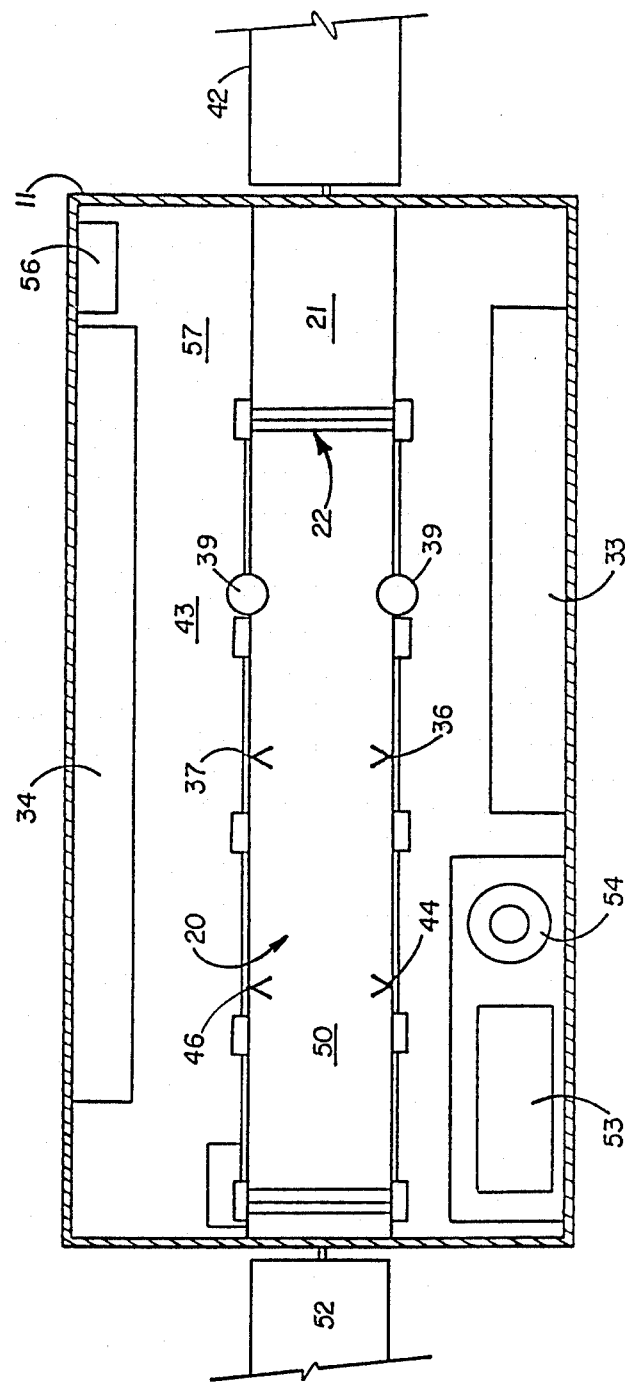
FIG. 4 is an exposed view of the floor plan of FIG. 1 showing the arrangement of the basic components of the apparatus in accordance with the present invention.

Turning now with reference to FIG. 4 where the floor plan is depicted. In FIG. 4 it can be seen that holding tank 31 is situated on top of frame 11 and frame 11 is further provided with a floor 43 upon which the operator can move about on either side of wash tunnel 20. The carts 19 as depicted in FIG. 1 are placed upon pivotal lifting table 42 and then moved to prewash area 21 whereupon they are set upon conveyor 22 to start moving through wash tunnel 20. Rotary brushes 39 rotate to scrape off the excess grime and spray nozzles 36 and 37 spray hot high pressure cleaning fluid upon the cart. Once the cart has passed the cleaning area it is then sprayed with a sanitizing fluid through nozzles 44 and 46 and then exited by way of dryer area 50 and down ramp 52 to be returned to service.

As shown in FIG. 4 supply tank 33 for holding cleaning solution and supply tank 34 for holding sanitizing solution are included within enclosure 12 so that the entire unit is self contained. Although many capacities could be used for the supply tanks 33 and 34 it has been found that approximately 300 gallons of cleaning solution in tank 33 and 300 gallons of sanitizing fluid in tank 34 is sufficient to handle the normal needs of a grocery store having approximately 200 carts.

Continuing with reference to FIG. 4 it can be seen that the pump 53 which provides pressure for the cleaning fluid for the both the prewash area as well as within the hot water high pressure washing area is located next to the dryer area 50 in the forward portion of the device 10. A heater space 54 is also provided for heating the water as well as heating the air which is used in the drying portion 50.

An electrical connection switch box as well as hydraulic controls are located in the control box 56 which is close to area 57 in which the operator stands in order to control the entire operation of the washing of the carts.

Although specific applications, materials, components, sequences of events, and methods have been stated in the above description of the preferred embodiment of the invention, other suitable materials, other applications, components and process steps as listed herein may be used with satisfactory results and varying degrees of quality. In addition, it will be understood that various other changes in details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. A mobile self contained high pressure hot water cleaning systm for grocery carts comprising:
   a mobile frame means;
   an enclosure mounted on said frame means for receiving the grocery cart therein;
   a holding tank mounted on said frame means within said enclosure;
   a wash tunnel having a first set of spray nozzles and a second set of spray nozzles spaced downstream of the first set of spray nozzles; said wash tunnel mounted above said holding tank within said enclosure;
   cleaning brushes rotatably mounted in the tunnel for engaging and dislodging foreign particles from the grocery cart;
   a conveyor means mounted within said wash tunnel for conveying the grocery cart through said tunnel past the first and second set of spray nozzles and the brushes;
   a supply tank having a cleaning fluid within said enclosure wherein said supply tank is in fluid communication with said first set of spray nozzles;
   a supply tank having a sterilizing fluid within said enclosure wherein said second fluid supply tank is in fluid communication with said second set of spray nozzles;
   a drain means within said wash tunnel means wherein said drain means is in fluid communication with said holding tank means;
   a first pump means operably connected to pump said cleaning fluid to the first set of nozzles to clean the grocery cart;
   a second pump means operably connected to pump said sterilizing fluid to the second set of nozzles to sterilize the cleaned grocery cart; and
   a heater means operably connected to heat said first fluid.

2. The mobile self contained high pressure hot water cleaning system for grocery carts as described in claim 1 wherein said wash tunnel includes an entrance end and an exit end and wherein said first set of nozzles is mounted closer to said entrance of said wash tunnel means and wherein said second set of spray nozzles is mounted downstream of the first set of spray nozzles closer to said exit end of said wash tunnel.

3. The mobile self contained high pressure hot water cleaning system for grocery carts as described in claim 2 further comprising a cart lift means at said wash tunnel entrance means for lifting the grocery cart to said entrance.

4. The mobile self contained high pressure hot water cleaning system for grocery carts as described in claim 3 wherein said cleaning fluid is comprised of a detergent water solution.

5. The mobile self contained high pressure hot water cleaning system for grocery carts as described in claim 3 wherein said grocery cart lift means is hydraulically actuated.

6. The mobile self contained high pressure hot water cleaning system for grocery carts as described in claim 5 further comprising a wheel means attached to said frame means whereas said frame means and said wheel means constitute a trailer adapted to a prime mover.

7. The mobile self contained high pressure hot water cleaning system for grocery carts as described in claim 1 further comprising a high pressure hand operated wand attached to said frame means and operably connected to said first fluid wherein said wand means comprises a grocery cart prewash.

8. The mobile self contained high pressure hot water cleaning system for grocery carts as described in claim 7 wherein said holding tank means is comprised of a shallow floor mounted tank lying atop said frame means and being in fluid communication with said drain means.

9. The mobile self contained high pressure hot water cleaning system for grocery carts as defined in claim 1 wherein said conveyor means is comprised of a continuous belt and a plurality of rollers driven by an electric motor.

* * * * *